DOUBLE THRESHOLD GAIN REGULATOR FOR COMMUNICATION SYSTEMS

Filed April 20, 1964 2 Sheets-Sheet 1

INVENTORS
Richard H. Fish
Neale A. Zellmer
BY
C. A. Gulbrandsen
ATTY.

DOUBLE THRESHOLD GAIN REGULATOR FOR COMMUNICATION SYSTEMS

Filed April 20, 1964 2 Sheets-Sheet 2

INVENTORS
Richard H. Fish
Neale A. Zellmer
BY C. A. Gulbrandsen
ATTY.

United States Patent Office 3,360,748

Patented Dec. 26, 1967

3,360,748

DOUBLE THRESHOLD GAIN REGULATOR FOR COMMUNICATION SYSTEMS

Richard H. Fish, San Mateo, and Neale A. Zellmer, Belmont, Calif., assignors, by mesne assignments, to Automatic Electric Laboratories, Inc., Northlake, Ill., a corporation of Delaware Filed Apr. 20, 1964, Ser. No. 360,903
12 Claims. (Cl. 333—16)

This invention relates to regulating apparatus in communication systems. In particular the invention relates to channel regulating apparatus in carrier communication systems which is controlled by an inband signal to regulate the total incoming signal.

Regulation arrangements have been designed which employ various types of controlled loss arrangement which are inserted in the transmission path. Of course arrangements, one is described by N. A. Zellmer and G. S. Wu in their United States patent application, "Regulating Arrangement Employing a Symmetrical Varistor," Ser. No. 351,998 filed Mar. 16, 1964, now Patent Number 3,312,-907 and assigned to the same assignee as the present invention, as an active variolosser regulating arrangement employing a symmetrical varistor. This regulating arrangement has a fixed bias control as a portion of a variable control bias to prevent it from rushing to maximum gain upon loss of the input signal. "Gain Regulation Circuit," another United States patent application of N. A. Zellmer and R. H. Fish, Ser. No. 306,109 filed Sept. 3, 1963, now Patent Number 3,328,716, and assigned to the same assignee as the present invention, describes the use of an electrochemical analog memory device, which upon loss of the pilot signal maintains the through transmission gain according to the last sensed pilot signal level until the pilot signal has returned.

The present invention allows carrier communication systems to employ inband signal tones for both supervisory and regulation purposes. In the system described herein, the inband signal tone is present until a channel is seized, after which the inband signal tone is then enhanced to a much higher level and used for dial pulse supervisory signals. However, with this technique difficulties would arise if the inband signal were permitted to control regulation during such a high level condition. Also, since other voice frequency signals, for example a test tone, may be attenuated to a relatively low level with respect to the system's nominal level, it is not desirable for these signals to change the system gain. According to this invention regulation should therefore be governed by the inband signal tone as it occurs over a specified range.

The inband signal tone is present before channel seizure and may be utilized for system gain compensation during the idle condition of a channel. However, in the present system upon seizure the inband signal at its nominal level is removed and essentially replaced with the same signal greatly enhanced to facilitate dialing. The above two patent applications, Ser. No. 351,998 filed Mar. 16, 1964, now Patent Number 3,312,907 and 306,109, now Patent Number 3,328,716, described means for regulating upon the loss of the regulating signal. Respectively, they describe a fixed bias means to prevent the regulator from a tendency to adjust for maximum gain, and an electrochemical analog memory to provide the same regulation after signal loss as was provided prior to signal loss, the regulating signal again gaining control upon its return.

The above described arrangements however do not provide control of regulation for systems which are of the inband signaling type. A feature of the present invention resides in the use of means for controlling regulation over a predetermined range and means for providing upper and lower threshold level lockout for signal levels that are outside of this predetermined regulation range.

It is the object of the invention to provide a new and improved regulation arrangement for permitting regulation in carrier communication systems which employ inband signaling.

It is a further object of the invention to provide means for compensating carrier channel gain over a predetermined inband signal range and for maintaining regulation within that range upon the loss of the regulating inband signal.

Other objects and features of the invention will become apparent and the invention will best be understood from the following description taken in conjunction with the accompanying drawings.

In describing the invention it would perhaps be advantageous to use a specific set of values for signal levels and the like. These are offered by way of illustration only and should not be considered in any way as limitations of the scope of the invention.

Assume for example that an inband signal of 2.6 kc. is used for regulating a 10 db range with a nominal —14 db signal tone level. This provides a regulating range from —9 db to —19 db. The signal tone enhanced by 12 db would be at —2 db, which would exceed the upper (—9 db) threshold and therefore terminate regulation. A test tone of 1 kc., transmitted during absence of signal tone is attenuated below the lower (—19). threshold once again terminating regulation.

Figure 1:
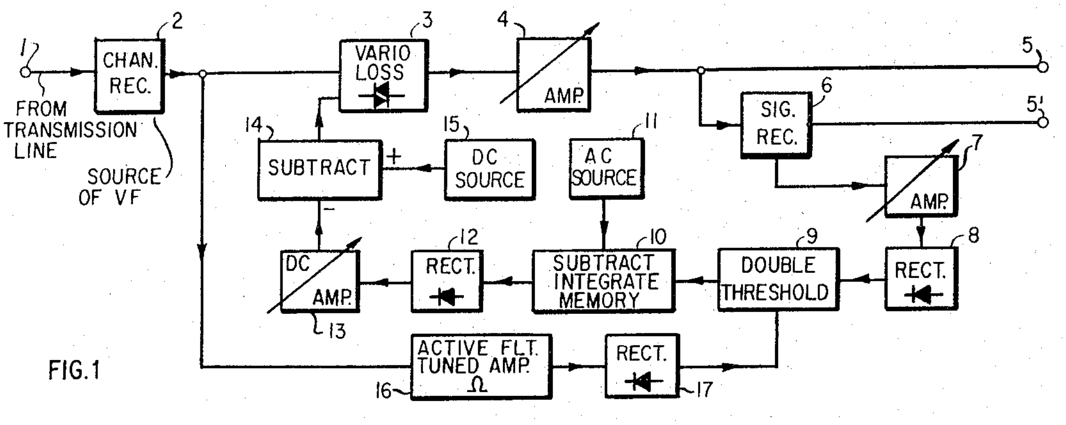
FIG. 1 is a block diagram representation of one embodiment of the invention.

FIG. 1 describes a double threshold channel regulation arrangement in block form. Signals, including speech signals of approximately 0.3 kc. to 3.5 kc. or an inband signal tone of 2.6 kc., enter the channel receiver 2 at input terminal 1 from the transmission medium via auxiliary carrier communications equipment (not shown). From the channel receiver the signals pass through a variolosser multiplier stage 3 and a variable amplitfier 4 to the output terminal 5. From the amplifier 4 the output is also connected to the signal receiver 6 which reads the supervisory signals of the inband tone during dialing and indicates these supervisory signals at terminal 5'. The signal is passed from the signal receiver to a variable amplifier 7 and on to a rectifier 8 where it is converted to a D-C signal indicative of the line attenuation characteristics. The D-C signal is then passed through the double threshold device 9, which will be explained in detail below, to the substractor-integrator apparatus 10. Also to be explained in detail below, the subtractor-integrator apparatus receives an A-C reference signal from source 11. The output of apparatus 10 is rectified by rectifier 12, amplified by the D-C amplifier 13 and fed to the subtractor 14 which may advantageously be similar to the subtracting arrangement of the above Zellmer and Wu application Ser. No. 351,998, filed Mar. 16, 1964, now Patent Number 3,312,-907. As in that application, a fixed D-C bias is supplied by source 15. The feedback loop is completed by connecting the subtractor 14 to the variolosser multiplier 3.

In addition to being transmitted through the variolosser arrangement and around the feedback loop, the inband signal is also an input signal to the active filter tuned amplifier 16 followed by rectifier 17. This serves as the control signal for the double threshold device 9. The double threshold device acts simply as a series switch between the rectifier 8 and the subtractor-integrator 10 closed when the level of the inband signal is between −9 db and −19 db and open when it is not within that range. These conditions will be discussed in greater with reference to FIG. 2.

Figure 2:
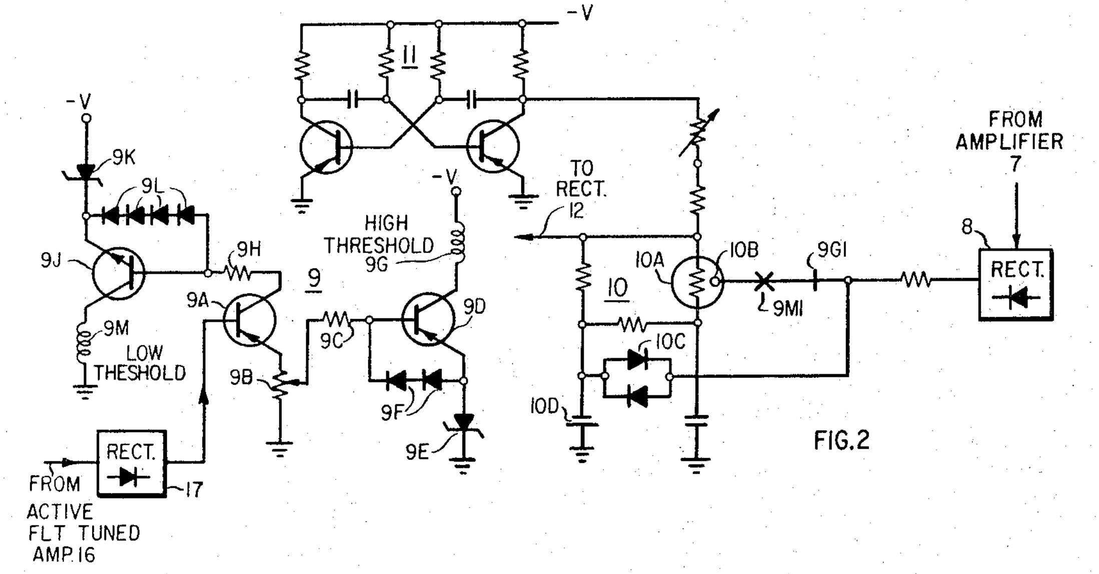
FIG. 2 is a circuit diagram of a portion of FIG. 1 showing double threshold apparatus.

FIG. 2 shows a portion of the feedback path and the double threshold device 9 of FIG. 1 in more detail including three transistor 9A, 9D, 9J and two relays 9G, 9M. A constant-current astable multivibrator serves as the A-C source 11.

Figure 4:
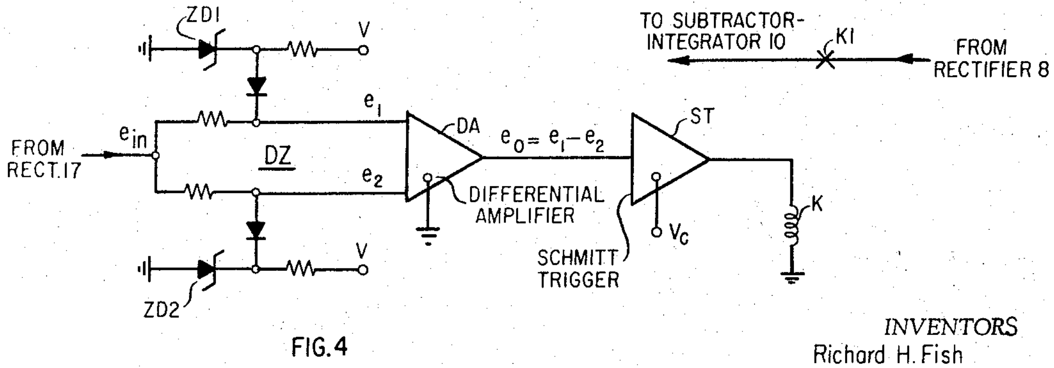
FIG. 4 is another double threshold apparatus which may be employed in the invention.

FIG. 4 describes another double threshold arrangement including a Zener diode circuit D2, a differential amplifier DA, a Schmitt trigger circuit ST, and a relay K which controls the D-C input to the integrator circuit.

Figure 5A:
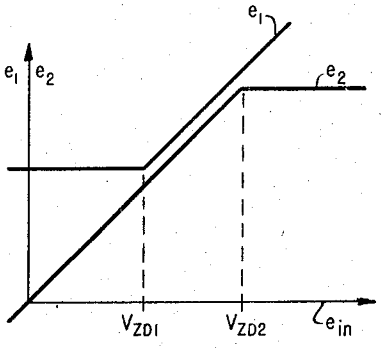
FIGS. 5A and 5B are graphical explanations of the operation of the apparatus of FIG. 4.
Figure 5B:
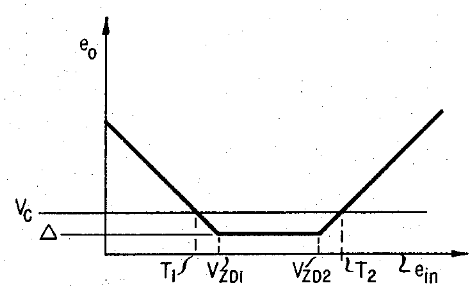

FIGS. 5A and 5B are characteristic curves of the operation of FIG. 4.

At this point it would perhaps be best to describe the operation of the integrator portion of our subtract-integrate aparatus 10. The integrator shown in FIG. 2 is an electrochemical analog memory device having two inputs, one from the A-C source 11 and one from the rectifier 8. The memistor presents an A-C resistance whose time rate of change is proportional to the negative direct current into the plating electrode 10B. The instantaneous output voltage to rectifier 12 is the product of the input alternating current from source 11 times the instantaneous A-C resistance of the memistor. The memistor is then an integrator with respect to these two variables. Battery 10D. which could be replaced with Zener or Stabistor diode circuitry, acts as the subtractor portion of the circuit. When the voltage input to electrode 10B equals this D-C reference voltage, the input current to the memistor is zero. The gain of the preceding amplifier is then adjusted so that when the output of the regulator is −14 dbm, the plating current is zero.

Ignoring for a moment elements 9G1 and 9M1 it is easily seen that as the level of the inband signal increases, the current out of electrode 10B increases. This causes an increase in the A-C resistance of the memistor element 10A. Since the A-C input from the multivibrator 11 is constant, the increasing resistance of the memistor causes the input to rectifier 12 to increase. A decrease in the level of the inband signal has a similar, but opposite effect on the memistor. Diodes 10C protect against a direct-current overload.

From the foregoing, automatic regulation has been shown for the regulator. However, an area of major importance, double threshold regulation, is described by reference 9 in FIG. 2. As the ambient conditions of the transmission line change, the attenuation effects on the incoming signal change. The inband signal will therefore correspondingly increase or decrease in level. For illustration assume that the active filter tuned amplifier 16 of FIG. 1 has a bandwidth of 150 c.p.s. centered at our 2.6 kc. inband frequency. The regulator is designed to be insensitive to voice energy falling within the regulating range. The regulating signal is passed to rectifier 17 (FIG. 2) where a D-C control signal is developed for the double threshold arrangement 9.

In FIG. 2 transistor 9A accepts the D-C signal from rectifier 17 at its base. Transistor 9A supplies base inputs via resistances 9C, 9H to transistor 9D and 9J respectively. Transistor 9D controls high threshold lockout and transistor 9J controls the low threshold lockout. As the level of the output signal rises each of the transistors 9D, 9J switches from off to on. Between the two threshold levels only transistor 9J is on allowing relay 9M to be operated and contacts 9M1 to be closed. This completes a path from rectifier 8 through normally closed contacts 9G1 and just-closed contacts 9M1 to the plating electrode 10B of the memistor. If the input level increases above the upper threshold, transistor 9D turns on and relay 9G operates opening its normally closed contacts 9G1 and removing the D-C input signal ot the memistor arrangement. If the input level decreases below the lower threshold, transistor 9J turns off and relay 9M restores opening contacts 9M1 and removing the D-C input signal to the memistor arrangement. Therefore, as long as the level of the input inband signal is between the upper and lower thresholds, the feedback path will derive a corresponding D-C bias for the variolosser arrangement. When the level of the input signal is not within the regulating range, the memistor remembers the last received D-C level from rectifier 8 and furnishes the same correction until the inband level is again within the regulating range. Zener diodes 9E, 9K act as subtractors in their respective circuits to provide threshold reference potentials at the emitter electrodes of transistors 9D, 9J.

Figure 3A:
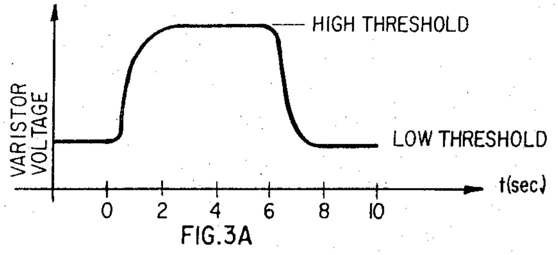
FIGS. 3A to 3D are curves to aid in describing the invention.
Figure 3B:
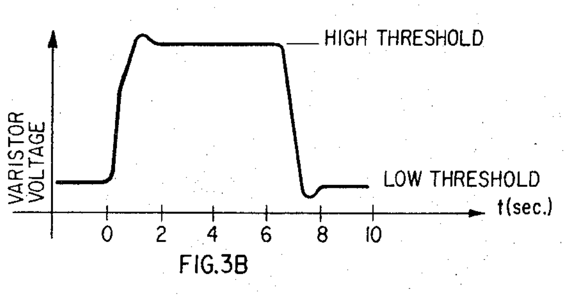

Referring to FIGS. 3A to 3D experimental results are shown for a regulator arrangement employing an active varistor variolosser as mentioned above. FIGS. 3A to 3D show system step response with respect to various conditions. The time constant is such that the regulator is fully settled in about one second. For FIG. 3A the A-C resistance of the varistor is about 20 ohms and the dynamic resistance change over the regulation range is above 5 ohms. In FIG. 3B decreasing the dynamic resistance change shows an overshoot due to small rectifier time constants.

Figure 3C:
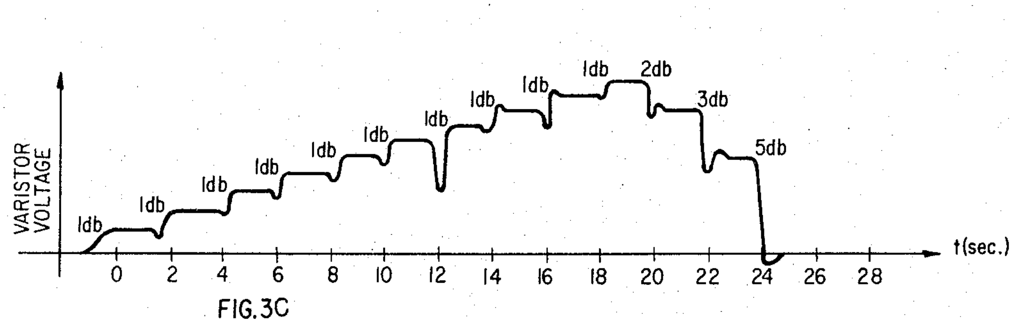

FIG. 3C shows system response for steps of 1 db over the regulating range, then 2 db, 3 db and 5 db. It should be noted that the time to reach nominal output in all cases is the same, namely, one second.

Figure 3D:
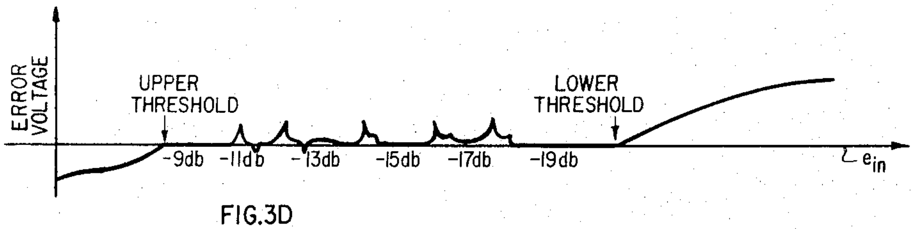

FIG. 3D shows the error voltage at the memistor verses input amplitude. The input was stepped in 2 db steps over the regulating range and varied continuously from the threshold levels to show the regulator cut-out action.

FIG. 4 supplemented by FIGS. 5A and 5B, describes another double threshold arrangement. The rectified inband signal from rectifier 17 is employed as an input signal to a dual-breakdown Zener circuit having two outputs. These two outputs $e_1$, $e_2$ of which $e_1$ is always greater than $e_2$ are employed as inputs to a differential amplifier DA which provides this difference as an output. A Schmitt trigger circuit ST biased by potential $V_c$ controls the operation of relay K having contacts K1 between rectifier 8 and the subtractor-integrator 10. From FIGS. 5A and 5B it can be seen that the trigger circuit causes contacts K1 to be closed when the input level indication is between the potentials $T_1$ and $T_2$ which are trigger potentials as the input to the trigger circuit goes above and below bias $V_c$ (FIG. 5B).

Many changes and modifications can be made in the invention by those skilled in the art without departing from the spirit and scope of the invention and should be included in the appended claims.

What is claimed is:

1. In a communications system, an arrangement for regulating the gain of a transmission path to compensate for level variations of an incoming signal received at the input of said transmission path, said incoming signal including an inband control signal, said arrangement comprising;

(a) a variolosser in said transmission path having an incoming signal input, a regulation signal input, and an output;

(b) rectifier means coupled to said variolosser output;

(c) means tuned to said control signal interposed between said rectifier means and said variolosser output;

(d) means interposed between said rectifier means and said variolosser regulation signal input for deriving said regulation signal, memory means included in said regulation signal derivation means for providing upon the loss of said control signal, substantially the same regulation signal as it provided immediately prior to said loss;

(e) means governing the connection between said rectifier means and said memory means; and (f) regulation control means connecting to said transmission path input and to said governing means, and tuned to said inband control signal for deriving a level range signal for controlling said governing means said regulation control so that said rectifier means is connected to said memory means only when the level of said inband control signal is within a predetermined range.

2. In a communications system, as claimed in claim 1, wherein said memory means includes integrating means, said regulation signal being an integral function of the rectified inband control signal.

3. In a communications system, as claimed in claim 1, wherein said memory means comprises:

(a) a memistor connected to said rectifying means said memistor having an instantaneous A-C resistance which is a function of the rectified inband control signal; and (b) a source of alternating current connected to said memistor, said regulation signal being a function of the instantaneous A-C resistance of said memistor and the current of said A-C source.

4. In a communications system, as claimed in claim 1, wherein said connection governing means includes switch means, and wherein said regulation control means comprises:

(a) second rectifier means for providing said range signal as a direct current signal according to the level of said inband control signal; and (b) means connected to said second rectifier means and having upper and lower operating thresholds defining said predetermined range, said threshold means operated by said D-C range signal to control the operation of said switch means.

5. In a communications system, as claimed in claim 4, wherein said threshold means comprises:

(a) first and second relays, said first relay having normally closed contacts included in said switch means and said second relay having normally open contacts included in said switch means and serially connected to said normally closed contacts;

(b) first and second relay drivers respectively connected to said two relays for energizing said relays; and (c) means connected to said two drivers and to said second rectifier means for selectively enabling said two drivers according to the level of said D-C range signal.

6. In a communications system, as claimed in claim 4, wherein said threshold means comprises:

(a) relay means including contacts in said switch means;

(b) circuit means, including breakdown diodes, connected to said second rectifier means for deriving from the D-C range signal two diode-shaped references;

(c) differential amplifier means connected to said circuit means for developing an output that is a function of said two diode-shaped references; and (d) trigger means connected to said differential amplifier means and to said relay means, said trigger means operated by said differential amplifier means to control the operation of said relay means.

7. A regulating arrangement for compensating level variations of an input signal containing a predetermined control tone, said arrangement comprising:

(a) a through transmission path including a variolosser having an input for receiving said input signal, a control input for receiving a gain control signal, and an output;

(b) feedback apparatus connected to said variolosser, including memory apparatus, for deriving said gain control signal as a function of said control tone and to further provide, upon loss of said control tone, compensation corresponding to the level of said control tone immediately prior to said loss; and (c) means connected to said memory apparatus for controlling regulation, said regulation control means adapted to receive said control tone and operated by said control tone to make said memory apparatus effective to limit automatic compensation to a predetermined level range of said control tone.

8. In a carrier communications channel including a channel receiver for receiving an incoming signal including an inband tone, said tone being at a nominal level during an idle condition and at a higher level during a signaling condition, a signal receiver for providing supervisory signals in response to said inband tone, said signal receiver having an input and at least two outputs of which one provides said inband tone, and an arrangement for regulating said incoming signal over a predetermined level range of said inband tone not including the said higher level, said regulating arrangement comprising:

(a) a variolosser having an input connected to said chainnel receiver for receiving said incoming signal, said variolosser further having a regulation signal input and an output;

(b) an amplifier connected to said variolosser output providing an output for said regulating arrangement, said signal receiver input connected to said amplifier output;

(c) a rectifier having an input connected to said one output of said signal receiver and having an output;

(d) means for deriving said variolosser regulation signal, said regulation signal deriving means having an input connected to said rectifier output and an output connected to said variolosser regulation signal input, memory apparatus included in said regulation signal deriving means for providing, upon the loss of said inband tone, substantially the same regulation signal as provided immediately prior to said loss; and (e) range control means having an input connected to said channel receiver and tuned to said inband tone, said range control means including switch means interposed between said rectifier output and said regulation signal deriving means input and operated to apply said rectifier output to said regulation signal deriving means input only when the level of said inband tone is within said predetermined range.

9. In a carrier communications channel, as claimed in claim 8, wherein said memory apparatus is further an electrochemical analog memory comprising:

(a) a source of alternating current;

(b) a memistor connected to said A-C source and to said switch means, said memistor making said regulation signal deriving means effective according to the last-sensed inband tone level.

10. In a carrier communications channel, as claimed in claim 9, wherein said switch means includes relay means having contacts interposed between said memistor and said rectifier, and relay powering means operated by said inband tone for controlling the operation of said relay means in accordance with level of said inband tone.

11. A regulating arrangement for compensating for variations in the level of voice frequency signals received by the input of a transmission path, said voice frequencies including a control frequency, said transmission path including a variolosser having a signal input, a control input and a signal output, a feedback loop connected between said signal input and signal output of said variolosser, said loop including means for deriving from the control frequency appearing at said signal output an electrical gain control and for impressing the last-mentioned electrical control on said control input, apparatus included in said means which, upon loss of said control frequency, maintain the level of said electrical gain control substantially at the value existing immediately prior to said loss, and means connected to the input of said transmission path which derive from the control frequency appearing at the last-mentioned input an electrical range control and impress said range control on said apparatus for limiting the operation of said apparatus to a predetermined level range only of said control frequency.

12. Apparatus for controlling an output signal as a function of an input signal of varying magnitude, said apparatus comprising:

(a) a source of alternating current providing said input signal;
(b) a power source for said output signal;
(c) memory means having an input connected to said power source, a control input connected to said A-C source, and an output for supplying the controlled output signal, said memory means maintaining said output signal, in the case of interruptions of said input signal, at a level corresponding to the last sensed condition of said input signal; and
(d) means connected to said source and operated by said input signal to permit the connection of said source to said memory means control input only when the level of said input signal is within a predetermined range.

References Cited

UNITED STATES PATENTS

| | | | |
|---|---|---|---|
| 3,258,758 | 6/1966 | Byrd | 307—88.5 X |
| 3,303,429 | 2/1967 | Feller | 330—52 |
| 3,328,716 | 6/1967 | Fish et al. | 330—138 |

JOHN W. CALDWELL, *Primary Examiner.*

W. E. COOK, *Assistant Examiner.*